(12) United States Patent
Nelson et al.

(10) Patent No.: US 8,984,872 B2
(45) Date of Patent: Mar. 24, 2015

(54) HYDRAULIC ACCUMULATOR FLUID CHARGE ESTIMATION SYSTEM AND METHOD

(75) Inventors: Bryan E. Nelson, Lacon, IL (US); Jeremy T. Peterson, Washington, IL (US); Jeffrey L. Kuehn, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 792 days.

(21) Appl. No.: 13/178,797

(22) Filed: Jul. 8, 2011

(65) Prior Publication Data
US 2013/0008246 A1 Jan. 10, 2013

(51) Int. Cl.
*G01M 99/00* (2011.01)

(52) U.S. Cl.
CPC .................................... *G01M 99/00* (2013.01)
USPC .............................................. 60/418; 60/456

(58) Field of Classification Search
CPC .... F15B 2201/50; F15B 21/042; F15B 1/027; F15B 1/033; E02F 9/2217
USPC ............... 60/413, 414, 418, 421, 456; 701/50
See application file for complete search history.

(56) References Cited

U.S. PATENT DOCUMENTS

| | | | |
|---|---|---|---|
| 6,314,729 B1 | 11/2001 | Crull et al. | |
| 7,240,486 B2 * | 7/2007 | Huang et al. | 60/413 |
| 2008/0174174 A1 | 7/2008 | Burns et al. | |
| 2008/0295507 A1 | 12/2008 | Mueller et al. | |
| 2010/0307233 A1 | 12/2010 | Glasson et al. | |
| 2013/0202452 A1 * | 8/2013 | Schuette et al. | 417/46 |

FOREIGN PATENT DOCUMENTS

| | | | | |
|---|---|---|---|---|
| JP | 1989-131301 A | 5/1989 | | |
| JP | 2008-133848 A | 6/2008 | | |
| WO | 2010-083816 | 7/2010 | | |
| WO | WO 2010083816 A1 * | 7/2010 | | F01P 7/04 |

OTHER PUBLICATIONS

Hydraulics & Pneumatics, Technology Zones, http://www.hydraulicspneumatics.com/200/Issue/Article/False/84766/Issue, 2011 Penton Media, Inc.

* cited by examiner

*Primary Examiner* — Dwayne J White
*Assistant Examiner* — Matthew Wiblin
(74) *Attorney, Agent, or Firm* — BakerHostetler (57) ABSTRACT

A method for estimating a fluid charge of a hydraulic accumulator includes determining a first accumulator pressure at a first time with a pressure sensor, the first time during accumulator charging; determining a second accumulator pressure at a second time with the pressure sensor, the second time during accumulator charging; determining a first fan speed at the first time; determining a second fan speed at the second time; and estimating the fluid charge of the hydraulic accumulator as a function of the first accumulator pressure, the second accumulator pressure, the first fan speed, and the second fan speed.

20 Claims, 5 Drawing Sheets

HYDRAULIC ACCUMULATOR FLUID CHARGE ESTIMATION SYSTEM AND METHOD

TECHNICAL FIELD

The present disclosure relates generally to hydraulic circuits with accumulators. Specifically, an embodiment of the present invention relates to a method to estimate the fluid charge of an accumulator.

BACKGROUND

Power source-driven machines such as, for example, excavators, dozers, loaders, motor graders, and other types of heavy equipment typically include a cooling system that cools the associated power source and/or other machine components below a threshold that provides for longevity of the machines. The cooling system may include one or more air-to-air and/or liquid-to-air heat exchangers that may chill coolant circulated through the power source and/or machine components, and/or combustion air directed into the power source. Heat from the coolant or combustion air is transferred to air from a fan that is speed controlled based on a temperature of the power source, the temperature of machine component(s), and/or based on a temperature of an associated hydraulic system. The fan may also aid in circulating air in a machine compartment or space to increase the rate of heat dissipation.

The cooling system fan may be hydraulically powered. That is, a pump driven by the power source draws in low-pressure fluid and discharges the fluid at elevated pressures to a motor that is connected to the fan. When a temperature of the power source, machine component(s), and/or machine space is higher than desired, the pump and motor may work together to increase the speed of the fan. When the temperature of the power source, machine component(s), and/or machine space is low, the pump and motor work together to decrease the speed of the fan and, in some situations, even stop the fan altogether. Under some conditions, fan rotation can even be reversed such that airflow through a heat exchanger is also reversed to help dislodge any debris that has collected in the heat exchanger.

In some machine operating conditions, a hydraulic circuit driving the cooling fan described above and/or other hydraulic circuits of the same machine may have excess energy capacity and may store at least a part of this excess energy capacity in one or more accumulators. Energy from one or more of the accumulators may later be used to supplement prime mover, engine, and or other energy producing or storing devices.

An energy management system may be used to ensure that machine power is sufficient to meet the needs of all machine components and to release stored power when needed. The energy management system may monitor and control the storage and release of energy from one or more hydraulic accumulators associated with a hydraulic fan circuit to provide needed power to machine components based at least partially on an estimate of the fluid charge of the one or more hydraulic accumulators.

US Patent Application Publication US20080174174 A1 filed by Burns et al. discloses that the amount of energy stored in an accumulator is a function of the accumulator pressure and the volume of fluid stored in the accumulator. The temperature of the system, the type of gas used to pre-charge the system, and the initial pressure of the pre-charge gas can impact the amount of energy stored at a given accumulator pressure. The equation to calculate the energy stored in an accumulator is: $E=(P_c*V_c-(P*V_c*((P_c/P)^{(1/k)})))/(1-k)$; where: E is the energy stored in the accumulator; $P_c$ is the pre-charge pressure of the accumulator; $V_c$ is the volume of gas in the accumulator at pre-charge; P is the current accumulator pressure; and k is ratio of specific heats (Boltzmann constant) for the pre-charge gas. The value of k for a gas varies with pressure at high pressures. Values of 1.3 to 1.8 may be used for typical gases and pressures. The pre-charge gas, pre-charge pressure, and volume of gas in the accumulator will not vary on a trailer during operation. Thus, the State Of Charge (SOC) of a hydraulic accumulator is a function only of its pressure. Although the accumulator pressure will vary with charge gas temperature, the SOC can be determined with acceptable accuracy even if this term is ignored.

SUMMARY OF THE INVENTION

One aspect of the disclosure includes a method for estimating a fluid charge of a hydraulic accumulator in a hydraulic circuit including a primary pump, a motor selectively fluidly connected to the pump, and drivingly connected to a fan. The method includes determining a first accumulator pressure at a first time with a pressure sensor, the first time during accumulator charging; determining a second accumulator pressure at a second time with the pressure sensor, the second time during accumulator charging; determining a first fan speed at the first time; determining a second fan speed at the second time; and estimating the fluid charge of the hydraulic accumulator as a function of the first accumulator pressure, the second accumulator pressure, the first fan speed, and the second fan speed.

Another aspect of the disclosure includes an alternative method for estimating a fluid charge of a hydraulic accumulator in a hydraulic circuit including a primary pump, a motor selectively fluidly connected to the pump, and drivingly connected to a fan. The method includes determining periodic accumulator pressures with a pressure sensor during an accumulator charging time period; determining periodic fan speeds during the accumulator charging time period; and estimating the fluid charge of the hydraulic accumulator as a function of the periodic accumulator pressures and the periodic fan speeds.

Another aspect of the disclosure includes an accumulator fluid charge estimation system having a hydraulic fan circuit and a controller. The hydraulic fan circuit includes a primary pump, a primary accumulator selectively fluidly connected to the pump, a fan, a motor selectively fluidly connected to the pump, and drivingly connected to the fan, a fan speed sensor configured to generate periodic fan speed signals indicative of periodic speeds of the fan, and a pressure sensor configured to produce periodic accumulator pressure signals indicative of periodic accumulator pressures at the primary accumulator. The controller is configured to estimate a fluid charge of the primary accumulator as a function of the periodic fan speed signals, and the periodic accumulator pressure signals during an accumulator charging period.

Another aspect of the disclosure includes an accumulator fluid charge estimation system having a hydraulic fan circuit and a controller. The hydraulic fan circuit includes a primary pump, a primary accumulator selectively fluidly connected to the pump, a fan, a motor selectively fluidly connected to the pump, and drivingly connected to the fan, a fan speed sensor configured to generate a first fan speed signal indicative of a first fan speed at a first time during an accumulator charging period, and a second fan speed signal indicative of a second fan speed at a second time during an accumulator charging period, and a pressure sensor configured to produce a first accumulator pressure signal indicative of a first accumulator pressure at the primary accumulator at the first time, and a second accumulator pressure signal indicative of a second accumulator pressure at the primary accumulator at the second time. The controller is configured to estimate a fluid charge of the primary accumulator as a function of the first fan speed signal, the second fan speed signal, the first accumulator pressure signal, and the second accumulator sensor signal.

Another aspect of the disclosure includes a machine having an engine, a hydraulic fan circuit, and a controller. The hydraulic fan circuit includes a primary pump drivingly connected to the engine, a primary accumulator selectively fluidly connected to the pump, a fan positioned to cool the engine, a motor selectively fluidly connected to the pump, and drivingly connected to the fan, a fan speed sensor configured to generate periodic fan speed signals indicative of periodic speeds of the fan, and a pressure sensor configured to produce periodic accumulator pressure signals indicative of periodic accumulator pressures at the primary accumulator. The controller is configured to estimate a fluid charge of the primary accumulator as a function of the periodic fan speed signals, and the periodic accumulator pressure signals during an accumulator charging period.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
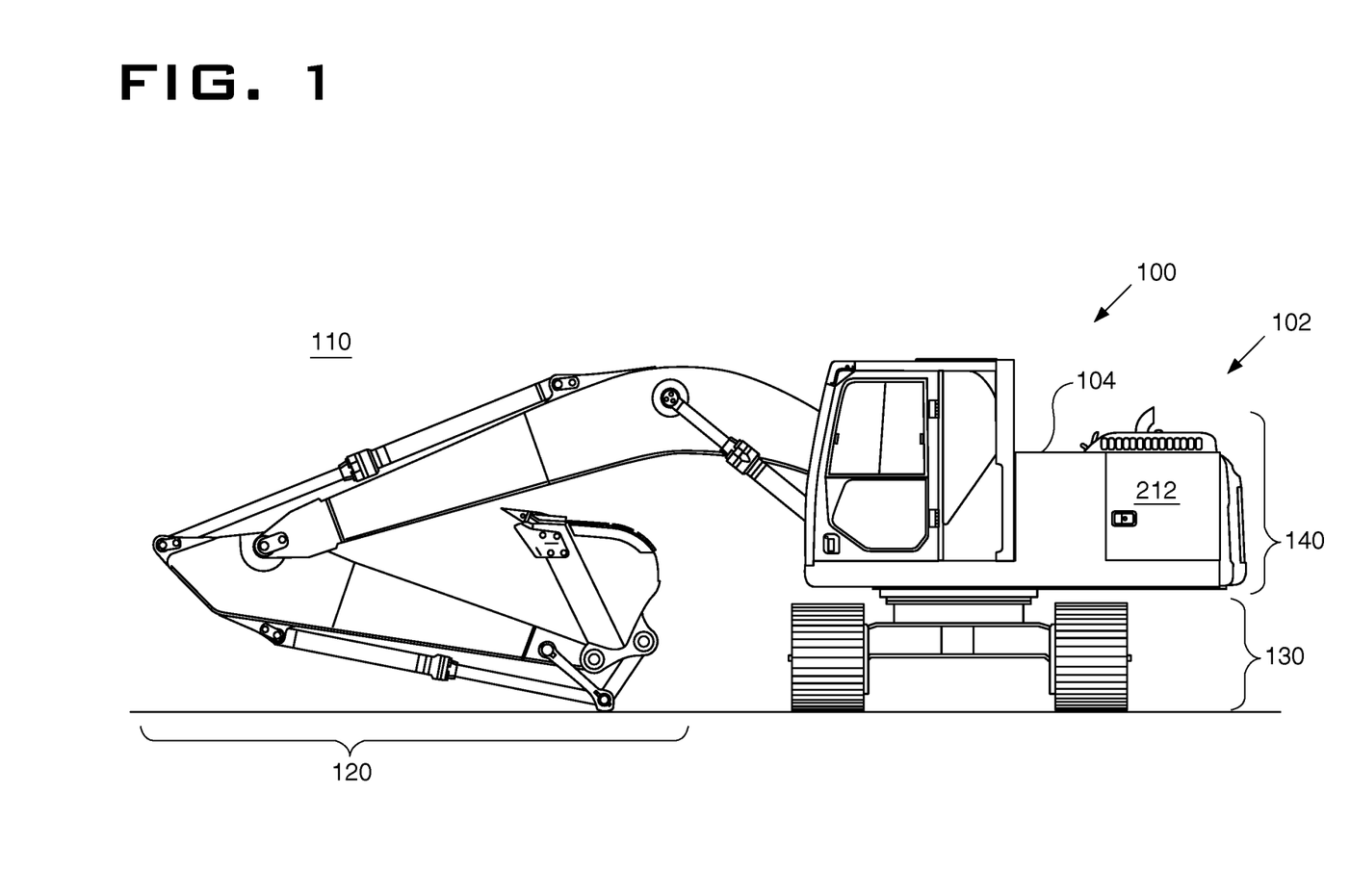
FIG. 1 is a pictorial illustration of an exemplary machine.

Referring now to FIG. 1, an exemplary embodiment of machine 100 is illustrated. In the embodiment illustrated, the machine 100 is depicted as a vehicle 102, and in particular an excavator 104. In other embodiments, the machine 100 may include any system or device for doing work. The machine 100 may include both vehicles 102 or stationary machines (not shown) such as, but not limited to, electric power generating devices, crushers, conveyors, tunnel borers or any other stationary machine that would be known to an ordinary person skilled in the art now or in the future. The vehicle 102 may include but is not limited to vehicles that perform some type of operation associated with a particular industry such as mining, construction, farming, transportation, etc. and operate between or within work environments (e.g. construction site, mine site, power plants, on-highway applications, marine applications, etc.). Non-limiting examples of vehicle 102 include trucks, cranes, earthmoving vehicles, mining vehicles, backhoes, loaders, material handling equipment, farming equipment, locomotives and other vehicles which travel on tracks, and any type of movable machine that would be known by an ordinary person skilled in the art now or in the future. Vehicle 102 may include mobile machines which operate on land, in water, in the earth's atmosphere, or in space. Land vehicles may include mobile machines with tires, tracks, or other ground engaging devices.

Machine 100 may be equipped with multiple systems that facilitate the operation of machine 100 at worksite 110, for example a tool system 120, a drive system 130, and a power system 140 that provides power to the tool system 120 and drive system 130. During the performance of most tasks, power from power system 140 may be disproportionately split between tool system 120 and drive system 130. That is, machine 100 may generally be either traveling between excavation sites and primarily supplying power to drive system 130, or parked at an excavation site and actively moving material by primarily supplying power to tool system 120.

Machine 100 generally will not be traveling at high speeds and actively moving large loads of material with tool system 120 at the same time. Accordingly, power system 140 may be sized to provide enough power to satisfy a maximum demand of either tool system 120 or of drive system 130, but not both at the same time. Although sufficient for most situations, there may be times when the total power demand from machine systems (e.g., from tool system 120 and/or drive system 130) exceeds a power supply capacity of power system 140. Power system 140 may be configured to consume stored energy during these times to temporarily increase its supply capacity. This additional supply capacity may also or alternatively be used to reduce a fuel consumption of power system 140 by allowing for selective reductions in the power production of power system 140, if desired.

Figure 2:
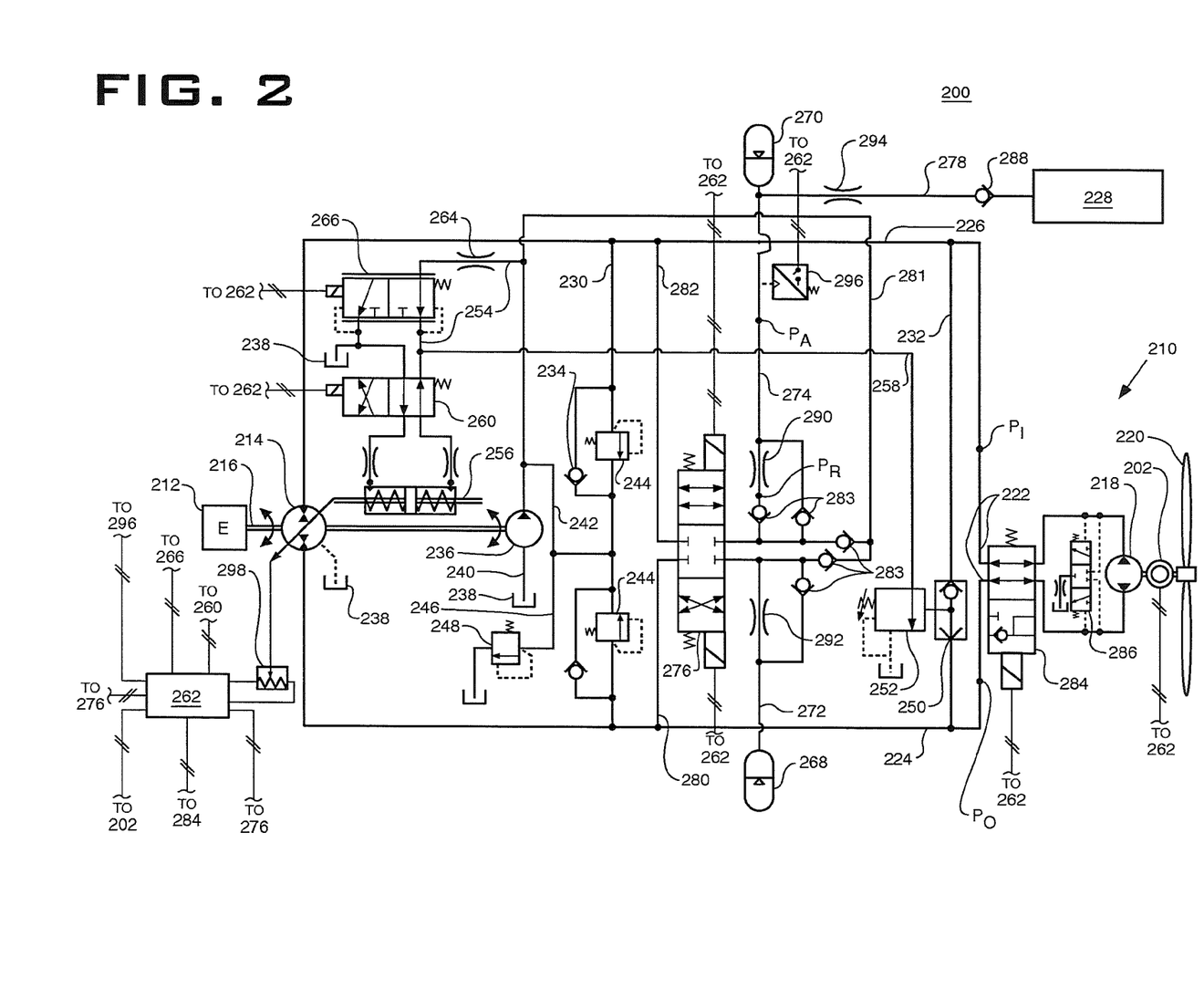
FIG. 2 is a schematic illustration of an exemplary hydraulic circuit.

As illustrated in FIGS. 1 and 2, one embodiment of power system 140 includes an engine 212, for example an internal combustion engine. In alternative embodiments the power system 140 may include other power sources such as electric motors (not shown), fuel cells, (not shown), batteries (not shown), ultra-capacitors (not shown), electric generators (not shown), and/or any power source that would be known by an ordinary person skilled in the art now or in the future.

In the embodiment depicted, the engine 212 is drivingly connected to a primary pump 214 in a hydraulic fan circuit 210. A fan 220 in the hydraulic fan circuit 210 may be positioned on the machine 100 to cool the engine 212, or in alternative embodiments, other power sources, machine 100 component(s), and/or machine 100 space(s) or compartment(s).

Hydraulic fan circuit 210 may include a collection of components that are powered by engine 212 to cool engine 212. In the depicted embodiment, the hydraulic fan circuit 210 includes a primary pump 214 connected directly to a mechanical output 216 of engine 212, a motor 218 fluidly connected to primary pump 214 by a closed-loop circuit 222, and the fan 220 connected to the motor 218. Engine 212 may drive primary pump 214 via mechanical output 216 to draw in low-pressure fluid and discharge the fluid at an elevated pressure. The motor 218 may receive and convert the pressurized fluid to mechanical power that drives fan 220 to generate a flow of air. The flow of air may be used to cool engine 212 and/or other power sources, machine 100 components, and/or machine 100 space(s) or compartments(s) directly and/or indirectly by way of a heat exchanger (not shown).

Primary pump 214 may be an over-center, variable-displacement or variable-delivery pump driven by engine 212 to pressurize fluid. For example, primary pump 214 may embody a rotary or piston-driven pump having a crankshaft (not shown) connected to engine 212 via mechanical output 216 such that an output rotation of engine 212 results in a corresponding pumping motion of primary pump 214. The pumping motion of the primary pump 214 may function to draw in low-pressure fluid expelled from the motor 218 via a low-pressure passage 224, and discharge the fluid at an elevated pressure to the motor 218 via a high-pressure passage 226. Low- and high-pressure passages 224, 226 together may form closed circuit 222.

Primary pump 214 may be dedicated to supplying pressurized fluid to only motor 218 via high-pressure passage 226 or, alternatively, may also supply pressurized fluid to other hydraulic circuits associated with machine 100 (e.g., to hydraulic circuits associated with tool system 120, drive system 130, etc.), if desired. Similarly, primary pump 214 may be dedicated to drawing low-pressure fluid from only motor 218 via low-pressure passage 224 or, alternatively, may also draw in low-pressure fluid from other hydraulic circuits of machine 100, if desired. It should be noted that, in some situations, primary pump 214 and motor 218 may be operated in reverse direction and, in these situations; the pressures within low- and high-pressure passages 224, 226 may be reversed.

Motor 218 may include a fixed displacement, rotary- or piston-type hydraulic motor movable by an imbalance of pressure acting on a driven element (not shown), for example an impeller or a piston. Fluid pressurized by primary pump 214 may be directed into motor 218 via high-pressure passage 226 and returned from motor 218 via low-pressure passage 224. The direction of pressurized fluid to one side of the driven element and the draining of fluid from an opposing side of the driven element may create a pressure differential across the driven element that causes the driven element to move or rotate. The pressure differential is the difference between the motor 218 input pressure $P_I$ and the motor 218 output pressure $P_O$. The direction and rate of fluid flow through motor 218 may determine the rotational direction and speed of motor 218 and fan 220. The pressure differential and fluid flow of motor 218 may determine the torque output.

Fan 220 may be disposed proximate a liquid-to-air or air-to-air heat exchanger (not shown) and configured to produce a flow of air directed through channels of the exchanger for heat transfer with coolant or combustion air therein. In other embodiments fan 220 may be configured and positioned to provide a flow of air directed to increase the rate of heat dissipation of machine 100 component(s) or in machine 100 spaces(s) or compartment(s). Fan 220 may include a plurality of blades connected to motor 218 and be driven by motor 218 at a speed corresponding to a desired flow rate of air and/or a desired coolant and/or air temperature.

Hydraulic fan circuit 210 includes a fan speed sensor 202 configured to generate a fan speed signal indicative of fan 220 speed. Fan speed sensors 202 are known in the art. Fan speed sensor 202 may include any fan speed sensor 202 that would be known by an ordinary person skilled in the art now or in the future. Fan speed sensor 202 may be communicatively connected to controller 262 to transmit the fan speed signal to the controller 262.

Low- and high-pressure passages 224, 226 may be interconnected via multiple different crossover passages. In the exemplary embodiment depicted in FIG. 2, two different crossover passages interconnect low- and high-pressure passages 224, 226, including a makeup/relief passage 230 and a pressure-limiting passage 232. Makeup/relief passage 230 may provide makeup fluid to low- and/or high-pressure passages 224, 226 to help ensure that hydraulic fan circuit 210 remains full of fluid, and also provide a leak path for high-pressure fluid within low- and/or high-pressure passages 224, 226 such that damage to the components of hydraulic fan circuit 210 may be avoided. Pressure-limiting passage 232 may provide for pilot pressure control associated with a displacement of primary pump 214.

One or more makeup valves 234, for example check valves, may be located within makeup/relief passage 230 to selectively connect the output from a charge pump 236 with low- and/or high-pressure passages 224, 226 based on pressures of fluid in the different passages. That is, when a pressure within low- and/or high-pressure passage 224, 226 falls below a pressure of fluid discharged by charge pump 236, makeup valve(s) 234 may open and allow fluid to pass from charge pump 236 into the respective passage(s). Charge pump 236 may be driven by engine 212 to rotate with primary pump 214 and draw in fluid from a low-pressure sump 238 via a tank passage 240, and discharge the fluid into makeup/relief passage 230 via a valve passage 242.

One or more relief valves 244 may also be located within makeup/relief passage 230. Relief valves 244 may be spring-biased and movable in response to a pressure of low- and/or high-pressure passages 224, 226 to selectively connect the respective passages with a low-pressure passage 246, thereby relieving excessive fluid pressures within low- and high-pressure passages 224, 226. An additional spring-biased pressure relief valve 248 may be located within low-pressure passage 246 and selectively moved by a pressure within low-pressure passage 246 between flow-passing and flow-blocking positions such that a desired pressure within low-pressure passage 246 may be maintained.

A resolver 250 may be disposed within pressure-limiting passage 232 and associated with a pilot pressure limiter 252. Resolver 250 may be configured to connect fluid from one of low- and high-pressure passages 224, 226 having the greater pressure with pilot pressure limiter 252. In most instances, resolver 250 connects the pressure from high-pressure passage 226 with pilot pressure limiter 252. However, when primary pump 214 and motor 218 are operating in the reverse flow direction or during an overrunning condition of motor 218, it may be possible for the pressure within low-pressure passage 224 to exceed the pressure within high-pressure passage 226. Under these conditions, resolver 250 may move to connect the pressure from low-pressure passage 224 with pilot pressure limiter 252. When the pressure of fluid passing through resolver 250 exceeds a threshold limit, pilot pressure limiter 252 may move from a flow-blocking position toward a flow-passing position. It is contemplated that the threshold limit of pilot pressure limiter 252 may be tunable, if desired, to adjust a responsiveness or performance of hydraulic fan circuit 210.

Pilot pressure limiter 252 may be in fluid communication with a pilot passage 254 that extends between charge pump 236 and a displacement actuator 256 of primary pump 214. Specifically, pilot pressure limiter 252 may be connected to pilot passage 254 via a passage 258. When pilot pressure limiter 252 moves toward the flow-passing position described above, pilot fluid from within pilot passage 254 may be allowed to drain to low-pressure sump 238. The draining of pilot fluid from pilot passage 254 may reduce a pressure of fluid within pilot passage 254.

The pilot fluid in passage 254 may be selectively communicated with displacement actuator 256 to affect a displacement change of primary pump 214. Displacement actuator 256 may embody a double-acting, spring-biased cylinder connected to move a swashplate, a spill valve, or another displacement-adjusting mechanism of primary pump 214. When pilot fluid of a sufficient pressure is introduced into one end of displacement actuator 256, displacement actuator 256 may move the displacement-adjusting mechanism of primary pump 214 by an amount corresponding to the pressure of the fluid. Pilot pressure limiter 252 may limit the pressure within pilot passage 254 based on a pressure of fluid within low- and high-pressure passages 224, 226 and, accordingly, also limit the displacement of primary pump 214.

Pump displacement sensor 298 may be configured to generate a swashplate position signal indicative of the displacement of primary pump 214. Pump displacement sensor 298 may be communicatively connected to controller 262. Controller 262 may be configured to receive the swashplate position signal and control hydraulic fan circuit 210 to produce a desired fluid flow and/or pressure. For example, controller 262 may control valves 260 and 266 to move the primary pump 214 swashplate to a desired position in order to provide the necessary flow and pressure to motor 218 to produce a desired speed of fan 220.

A directional control valve 260 may be associated with displacement actuator 256 to control what end of displacement actuator 256 receives the pressurized pilot fluid and, accordingly, in which direction (i.e., which of a displacement-increasing and a displacement-decreasing direction) the displacement-adjusting mechanism of primary pump 214 is moved by displacement actuator 256. Directional control valve 260 may be a spring-biased, solenoid-actuated control valve that is movable based on a command from controller 262. Directional control valve 260 may move between a first position at which a first end of displacement actuator 256 receives pressurized pilot fluid, and a second position at which a second opposing end of displacement actuator 256 receives pressurized pilot fluid. When the first end of displacement actuator 256 is receiving pressurized pilot fluid (i.e., when directional control valve 60 is in the first position), the second end of displacement actuator 256 may be simultaneously connected to low-pressure sump 238 via directional control valve 260. Similarly, when the second end of displacement actuator 256 is receiving pressurized pilot fluid (i.e., when directional control valve 260 is in the second position), the first end of displacement actuator 256 may be simultaneously connected to low-pressure sump 238 via directional control valve 260. One or more restrictive orifices 264 may be associated with pilot passage 254 to reduce pressure fluctuations in the pilot fluid entering and exiting the ends of displacement actuator 256 and, thereby, stabilize fluctuations in a speed of pump displacement changes.

A pressure control valve 266 may also be associated with pilot passage 254 and displacement actuator 256 and configured to control movement of displacement actuator 256 by varying a pressure of pilot passage 254. Pressure control valve 266 may be movable from a first position at which full charge pressure is passed through directional control valve 260, toward a second position at which some of the charge pressure is vented to low-pressure sump 238 before reaching directional control valve 260 and displacement actuator 256. Pressure control valve 266 may be movable from the first position against a spring bias toward the second position based on a command from controller 262. It is contemplated that pressure control valve 266 may be directly controlled via a solenoid or, alternatively, pilot operated via a separate solenoid valve (not shown), as desired. By selectively moving pressure control valve 266 to any position between the first and second positions, a pressure of the pilot fluid in communication with displacement actuator 256 and, hence, a displacement of primary pump 214, may be controlled.

At least one accumulator may be associated with closed circuit 222. In the embodiment of FIG. 2, two accumulators are illustrated, including a low-pressure accumulator 268 and a high-pressure accumulator 270. A low-pressure accumulator passage 272 and a high-pressure accumulator passage 274 may extend from low- and high-pressure accumulators 268, 270, respectively, to a discharge control valve 276. Discharge control valve 276 may be fluidly connected to low- and high-pressure passages 224, 226 by way of passages 280 and 282 respectively.

Discharge control valve 276 may be a double-acting, spring-biased, solenoid-controlled valve that is movable between three distinct positions based on a command from controller 262. In the first position (shown in FIG. 2), fluid flow through discharge control valve 276 may be inhibited. In the second position, fluid may be allowed to pass between low-pressure accumulator 268 and low-pressure passage 224 and between high-pressure accumulator 270 and high-pressure passage 226. In the third position, fluid may be allowed to pass between low-pressure accumulator 268 and high-pressure passage 226 and between high-pressure accumulator 270 and low-pressure passage 224. Discharge control valve 276 may be spring-biased to the first position.

Low- and high-pressure accumulators 268, 270 may be in fluid communication with pilot passage 254. Specifically, a fill passage 281 may fluidly connect each of low- and high-pressure accumulator passages 272, 274 to pilot passage 254. One or more check valves 283 may be disposed within fill passage 281 between pilot passage 254 and each of low- and high-pressure accumulators 268, 270 to help ensure a unidirectional flow of fluid from charge pump 236 through restrictive orifices 290, 292 into low- and high-pressure accumulators 268, 270 when law- and high-pressure accumulators 268, 270 are charging. The one or more check valves 283 may also facilitate flow of fluid bypassing the restrictive orifices 290, 292 when the low- and high-pressure accumulators 268, 270 are discharging. The restrictive orifices 290, 292 may have a uniform known cross section which may be useful in estimating the fluid charge of the low- and high-pressure accumulators 268, 270, as is explained in more detail below in relation to FIG. 4.

High-pressure accumulator 270 may also be in fluid communication with another hydraulic circuit 228 that forms a portion of for example, tool system 120, drive system 130, or another system of machine 100. In particular, an auxiliary supply passage 278 may fluidly connect hydraulic circuit 228 to high-pressure accumulator 270 to fill high-pressure accumulator 270 with waste or excess fluid having an elevated pressure. A check valve 288 and a restrictive orifice 294 may be disposed within auxiliary supply passage 278 to help provide for a unidirectional flow of fluid with damped oscillations from hydraulic circuit 228 into high-pressure accumulator 270. Hydraulic circuit 228 may include a tool actuation circuit, a transmission circuit, a brake circuit, a steering circuit, or any other machine circuit known in the art.

Fan circuit 210 includes a pressure sensor 296 configured to generate an accumulator pressure signal indicative of the fluid pressure at the high-pressure accumulator 270 positioned appropriately in the hydraulic fan circuit 210. For example, the pressure sensor may be in high-pressure accumulator passage 274 as depicted in FIG. 2. The pressure sensor 296 is communicatively connected to controller 262 to transmit the accumulator pressure signal to controller 262.

During accumulator discharge, it may be beneficial to substantially isolate motor 218 from low- and high-pressure passages 224, 226 (i.e., to substantially block direct fluid flow to motor 218 via low- and high-pressure passages 224, 226). For this reason, a fan isolation valve 284 may be fluidly connected to low- and high-pressure passages 224, 226, between motor 218 and low- and high-pressure accumulators 268, 270. Fan isolation valve 284 may be a spring-biased, solenoid-controlled valve that is movable between two distinct positions based on a command from controller 262. In the first position (shown in FIG. 2), fluid may be allowed to flow through fan isolation valve 284 to motor 218 via low- and high-pressure passages 224, 226. In the second position, fluid flow through fan isolation valve 284 may be inhibited. Fan isolation valve 284 may be spring-biased to the first position.

When motor 218 is isolated by fan isolation valve 284 (i.e., when fan isolation valve 284 is in the second position), fluid may still circulate through motor 218, and fan 220 may still be spinning. To help control fluid temperatures during this time, hydraulic fan circuit 210 may include a motor flushing valve 286. Motor flushing valve 286 may be in fluid communication with isolated portions of low- and high-pressure passages 224, 226, and configured to move between three positions based on the pressures of fluid within these passages. In the first position (shown in FIG. 2), fluid flow from low- and high-pressure passages 224, 226 to low-pressure sump 38 may be inhibited. When a pressure difference occurs between low- and high-pressure passages 224, 226, motor flushing valve 286 may move to the second or third positions to remove a small volume of high-temperature fluid to be replaced with low-temperature oil.

The controller 262 may include a processor (not shown) and a memory component (not shown). The processor may include microprocessors or other processors as known in the art. In some embodiments the processor may include multiple processors. The processor may execute instructions for implementing a method, as described below and in relation to FIGS. 3, 4, 5, and 6 for estimating a fluid charge of high-pressure accumulator 270. In the depicted embodiment, the processor may execute instructions for estimating a fluid charge of high-pressure accumulator 270 as a function of the fan speed signal and the accumulator pressure signal.

Such instructions may be read into or incorporated into a computer readable medium, such as the memory component or provided external to processor. The instructions may include multiple lines or divisions of code. The lines or divisions of code may not be consecutive order, and may not be located in the same section of code. In alternative embodiments, hard-wired circuitry may be used in place of or in combination with software instructions to generate the machine function control signal and implement the method for estimating a fluid charge of accumulator 270. Thus embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above or which would be known to an ordinary person skilled in the art now or in the future. The memory component may include multiple memory components.

The controller 262 may be enclosed in a single housing. In alternative embodiments, the controller 262 may include a plurality of components operably connected and enclosed in a plurality of housings. The controller 262 may be located on-board the machine 100, or may be located off-board or remotely.

Controller 262 is configured to receive the fan speed signal and the accumulator pressure signal. Controller 262 may be communicatively connected to valves 260, 266, 276, and 284 to control operations of hydraulic fan circuit 210.

Industrial Applicability

The hydraulic fan circuit 210 may operate in multiple modes. During an exemplary first mode of operation, engine 212 may drive primary pump 214 to rotate and pressurize fluid. The pressurized fluid may be discharged from primary pump 214 into high-pressure passage 226 and directed into motor 218. As the pressurized fluid passes through motor 218, hydraulic power in the fluid may be converted to mechanical power used to rotate fan 220. As fan 220 rotates, a flow of air may be generated that facilitates cooling of engine 212, or other machine 100 component(s), space(s), and/or compartment(s). Fluid exiting motor 218, having been reduced in pressure, may be directed back to primary pump 214 via low-pressure passage 224 to repeat the cycle.

The fluid discharge direction and displacement of pump 214 during this first exemplary mode of operation may be regulated based at least partially on the fan speed signal and the swashplate position sensor. Controller 262 may receive signals, and execute code, that indicates a desired fan 220 speed. Controller 262 may then generate appropriate commands to be sent to directional control valve 260 and pressure control valve 266 to affect corresponding adjustments to the displacement of primary pump 214.

Low- and/or high-pressure accumulators 268, 270 may be charged during the exemplary first mode of operation in a least three different ways. For example, when primary pump 214 is driven to pressurize fluid, any excess fluid not consumed by motor 218 may fill high-pressure accumulator 270 via discharge control valve 276, when discharge control valve 276 is in the second position. Similarly, fluid exiting motor 218 may till low-pressure accumulator 268. Low- or high-pressure accumulators 26S, 270 may only be filled while discharge control valve 276 is in the second position and pressures within low- or high-pressure passages 224, 226 are greater than pressures within low- or high-pressure accumulators 268, 270, respectively. Otherwise, low- or high-pressure accumulators 268, 270 may discharge fluid into low- or high-pressure passages 224, 226 when discharge control valve 276 is moved to the second position. The movement of discharge control valve 276 may be closely regulated based at least in part on the signal provided by pressure sensor 296, such that low- and high-pressure accumulators 268, 270 may be charged and discharged at the appropriate times. It should be noted that only one of low- and high-pressure accumulators 268, 270 may be filled at a time, while the other of low- and high-pressure accumulators 268, 270 will be discharging, and vice versa.

In an exemplary second mode, low- or high-pressure accumulators 268, 270 may be continuously charged via charge pump 236. Specifically, at any time during normal operation, when a pressure of fluid from charge pump 236 is greater than pressures within low- or high-pressure accumulators 268, 270, fluid may be passed from charge pump 236, through fill passage 281, and past check valves 283 into the respective low- and high-pressure accumulator 268, 270. During this second mode charge valve 276 may be in the first closed position.

High-pressure accumulator 270 may also be charged by hydraulic circuit 228. That is, at any time during normal operations, when a pressure of fluid from hydraulic circuit 228 is greater than a pressure within high-pressure accumulator 270, fluid may be passed from circuit 228, through auxiliary supply passage 278, and past check valve 288 into high-pressure accumulator 270.

When the controller 262 determines through sensor signals, and code execution that the demand for cooling air flow has been reduced, fan 220 may be slowed or even stopped, and controller 262 may implement an exemplary third mode of operation. During the exemplary third mode of operation, controller 262 may command fan isolation valve 284 to isolate motor 218 from primary pump 214, and then command discharge control valve 276 to move to one of the second and third positions depending on the desired flow direction of primary pump 214. At about this same time, controller 262 may command pressure control valve 266 to begin destroking primary pump 214. When the appropriate valve commands have been issued, fluid from within one of low- or high-pressure accumulators 68, 70 may discharge into low- or high-pressure passages 224, 226, respectively, via passages 272, 274, discharge control valve 276, and passages 280, 282, thereby driving primary pump 214 as a motor. By driving primary pump 214, hydraulic power from the accumulated fluid may be converted to mechanical power directed into engine 212 via mechanical output 216. This power assist may help to increase a power supply capacity and/or decrease a fuel consumption of engine 212 during the exemplary third mode of operation.

During discharge of one of low- or high-pressure accumulators 268, 270, while motor 218 is isolated from primary pump 214, fan 220 may continue to spin. Fan 220, may for exampled be equipped with a flywheel (not shown) or oversized to integrate the mass of a flywheel, and may spin for an extended period of time without being driven by motor 218. In one example, the extended period of time may be at least 4 seconds. In this manner, a significant amount of cooling may still be possible during discharge of low- or high-pressure accumulators 268, 270, and the speed of motor 218 may be substantially unaffected by the changing fluid pressures within the accumulators low- and high-pressure 268, 270. In addition, energy from the accumulated fluid may not be wasted on unnecessarily driving motor 218.

It is contemplated that accumulator discharge could alternatively occur without complete motor isolation, if desired. Specifically, fan isolation valve 284 could be controlled to move to any position between the first and second positions described above such that a desired amount of pressurized fluid from high-pressure accumulator 270 passes through and drives motor 218, while the remainder of the accumulated fluid passes through and drives primary pump 214. In order to provide for a desired motor/fan speed during accumulator discharge, however, while pressures within high-pressure accumulator 270 are changing (i.e., decreasing), the displacement of pump 214 may be selectively adjusted based on the fluid pressure signal from sensor 296 and/or based on fan speed signal.

The controller 262 may implement an energy management strategy to ensure that the machine 100 provides adequate energy to all loads. This may include controlling multiple energy producing and energy storing devices to provide energy to meet load demands. Energy producing and storing devices may include engine 212, fuel cells, electric motors, batteries, ultra-capacitors, accumulators 268, 270, and/or any energy producing or storing device that would be known to an ordinary person skilled in the art now or in the future. The controller 262 may determine how to meet load demands partially as a function of calculated or stored energy capacities of the energy producing or storing devices. The controller 262 may determine when to discharge the high-pressure accumulator to meet a load demand at least partially as a function of an estimated fluid charge of high-pressure accumulator 270.

Figure 3:
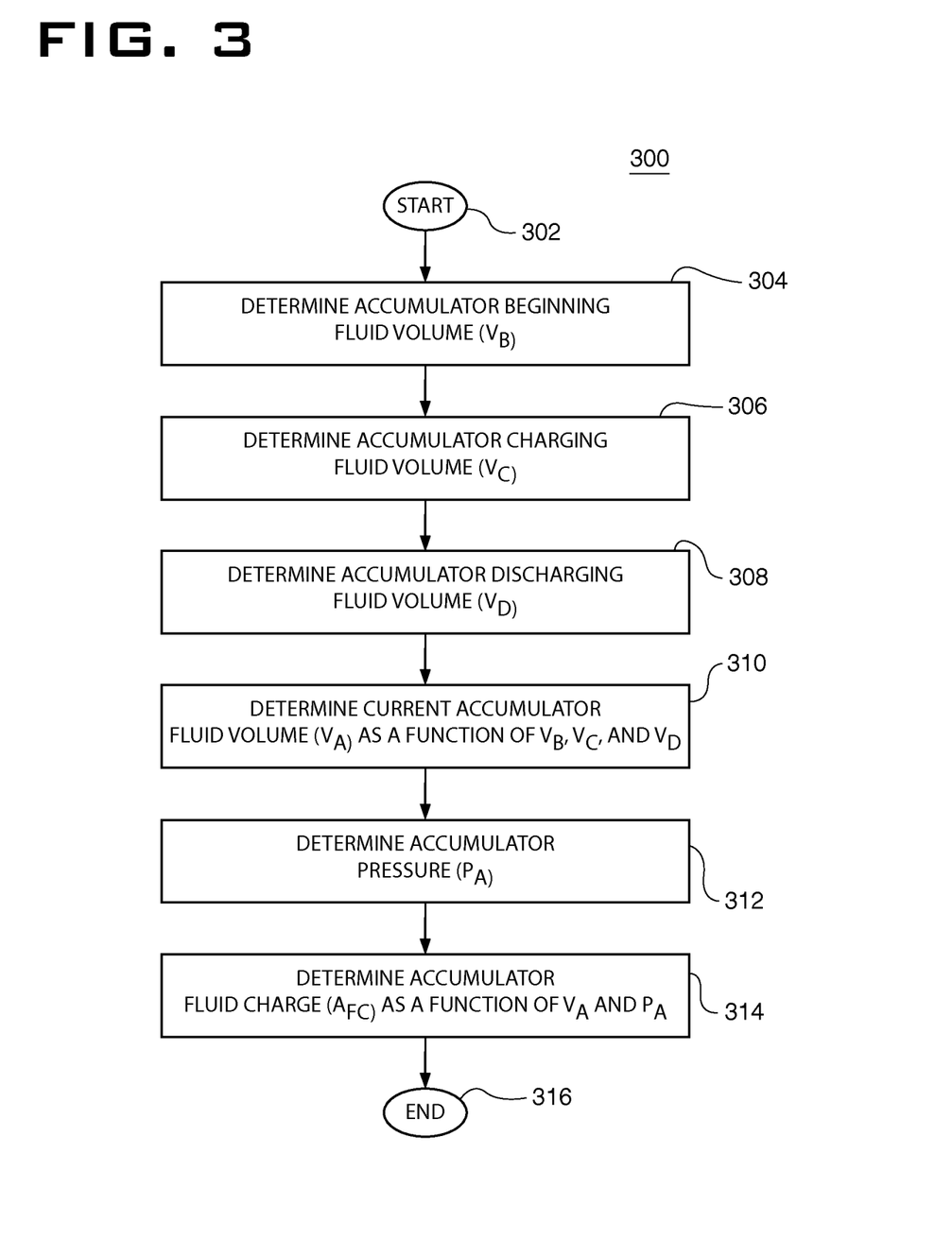
FIG. 3 is a flow chart of an exemplary method to estimate a fluid charge of an accumulator.

Referring now to FIG. 3, a method 300 for estimating a fluid charge of a hydraulic accumulator 270 in a hydraulic circuit 210 is depicted. The hydraulic circuit 210 includes a primary pump 214; and a motor 218 selectively fluidly connected to the pump 214, and drivingly connected to a fan 220. The method includes determining an accumulator pressure; determining a fan speed; and estimating the fluid charge of the accumulator as a function of the accumulator pressure, and the fan speed.

The method 300 for estimating a fluid charge begins at step 302 and proceeds to step 304. Step 304 includes determining the beginning volume of accumulator 270. Method 300 may be used at any point in time to determine the fluid charge of accumulator 270. At machine 100 start-up, the charge pump 236 may charge accumulator 270 to a beginning pressure while discharge control valve 276 is in the first position as shown in FIG. 2. The beginning fluid volume may be the fluid volume in the accumulator 270 after being charged to the beginning pressure at machine 100 start-up. In other embodiments the beginning fluid volume may be a calculated value based on accumulator 270 charging and discharging volumes. In other embodiments, the beginning fluid volume may be a known fluid volume based on the physical and operating characteristics of machine 100 and hydraulic fan circuit 210.

The controller 262 may calculate the fluid volume in the accumulator 270 after being charged to the beginning pressure at machine 100 start-up. Accumulator 270 may be discharged at machine shut-down and assumed to be at zero. Since volume is equal to flow rate multiplied by time, beginning fluid volume may be determined as a function of flow to the accumulator 270 and time as expressed in equation 1:

$$V_B = Q_B * t_B \quad \text{equation 1}$$

where $V_B$ is the beginning fluid volume in accumulator 270, $Q_B$ is the beginning flow rate to accumulator 270, and $t_B$ is the beginning accumulator charge time. The beginning fluid volume in accumulator 270 may be expressed as an integral function in which yields equation 2:

$$V_B = \int Q_B dt \quad \text{equation 2}$$

where $V_B$ is the beginning fluid volume in accumulator 270, and $Q_B$ is the flow rate to accumulator 270. The flow rate may be integrated over the beginning accumulator 270 charge time.

It is well known by ordinary persons skilled in the art that flow rate is equal to a constant times the area of a restriction times the square root of the quotient of the differential pressure times two and the density of the fluid. Restrictive orifice 290 includes a substantially constant cross sectional area which will be known by system designers. The pressure on one side of the restrictive orifice 290 is $P_R$. The pressure on the other side of the restrictive orifice 290 is $P_A$. $P_A$ may be determined by the accumulator pressure signal from the pressure sensor 296. Pressure relief valve 248 is configured to open at a known pressure. During machine 100 start-up, when discharge control valve 276 is in the first position, $P_R$ will be equal to approximately the known pressure that pressure relief valve 248 is configured to open at. Therefore, flow rate during start-up may be estimated by equation 3:

$$Q_B = C * A (\sqrt{[2(P_V - P_A)/\rho]}) \quad \text{equation 3}$$

where $Q_B$ is a flow rate during start-up, C is a constant, A is the known cross sectional area of the restrictive orifice 290, $P_V$ is the known pressure that pressure relief valve 248 is configured to open at, $P_A$ is the accumulator 270 pressure as indicated by the accumulator pressure signal, and ρ is the density of the fluid.

Since the beginning fluid volume of the accumulator 270 may be estimated by integrating the flow rate over the beginning charge time, it may be calculated and/or estimated by equation 4:

$$V_B = \int [C^*A(\sqrt{[2(P_V-P_A)/\rho]})]\,dt \qquad \text{equation 4}$$

where $V_B$ is the beginning fluid volume of accumulator 270, $Q_B$ is a flow rate during start-up, C is a constant, A is the known cross sectional area of the restrictive orifice 290, $P_V$ is the pressure that pressure relief valve 248 is configured to open at, $P_A$ is the accumulator 270 pressure as indicated by the accumulator pressure signal, and ρ is the density of the fluid.

In other embodiments, the beginning fluid volume in accumulator 270 may be calculated and/or estimated based on other methods that would be known by an ordinary person skilled in the art now or in the future. The method proceeds from step 304 to step 306.

Figure 4:
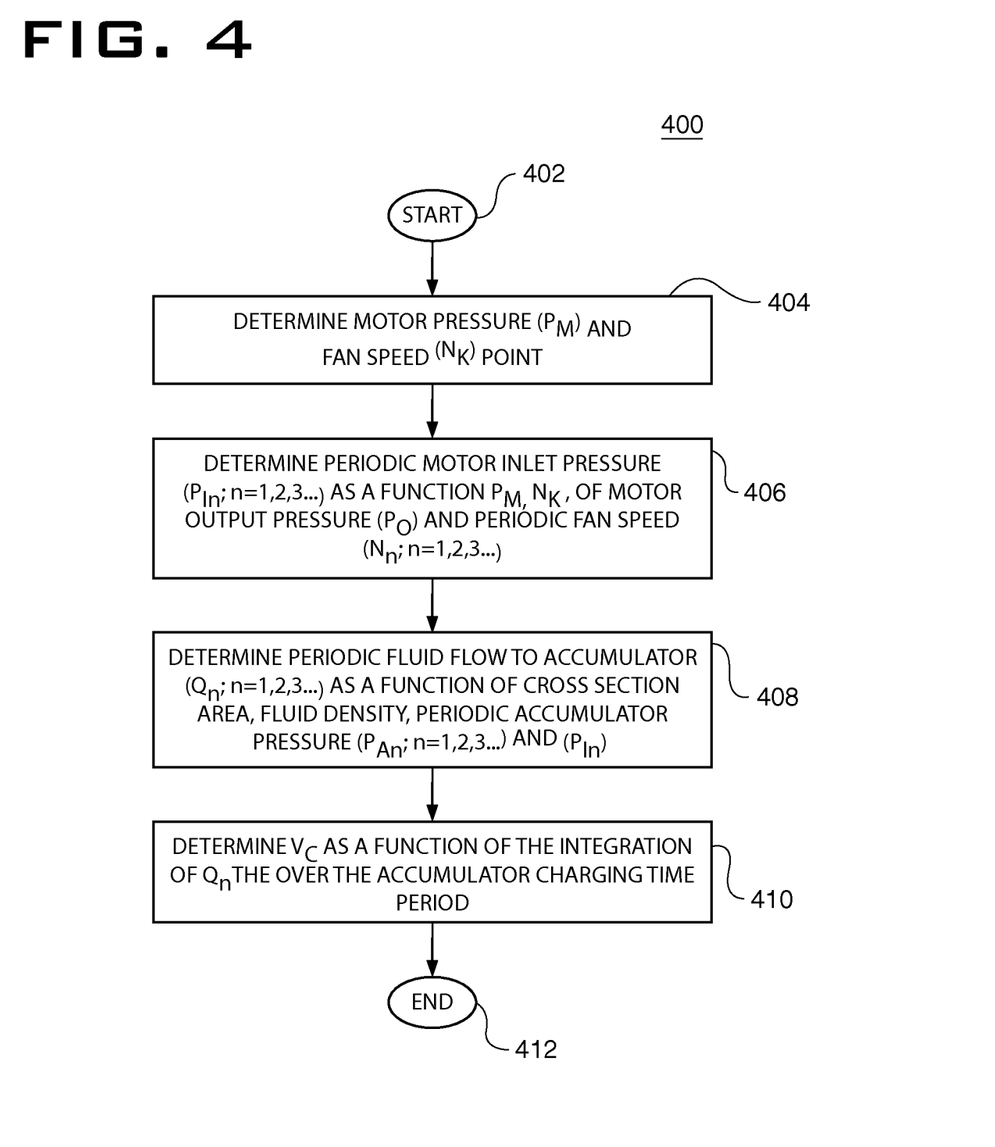
FIG. 4 is a flow chart of an exemplary method to estimate an accumulator charging fluid volume.

Step 306 includes determining the volume of fluid that entered the accumulator 270 during charging (referred to in FIG. 3 as accumulator charging fluid volume). Referring to FIG. 4, a method 400 to estimate an accumulator charging fluid volume is depicted. The method 400 includes determining the accumulator charging fluid volume as a function of an accumulator pressure and a fan speed. Method 400 begins at step 402 and proceeds to step 404.

Step 404 includes determining a pressure differential across the motor 218, $\Delta P_{MK}$, and a corresponding fan 220 speed, $N_K$. To calculate and/or estimate the accumulator 270 fluid charge, it may be necessary to know one corresponding motor 218 pressure differential and corresponding fan 220 speed. This one motor 218 pressure differential and corresponding fan 220 speed may be at any hydraulic fan circuit 210 operating point when discharge control valve 276 is in the second position, and the primary pump 214 is fluidly and drivingly connected to fan 220; and may be calculated and/or estimated in any way that would be known by an ordinary person skilled in the art now or in the future.

In one embodiment, the controller 262 may control hydraulic fan circuit 210 with the discharge control valve 276 in the second position to charge accumulator 270, until the accumulator pressure signal from the pressure sensor 296 stays substantially constant for a short time period. When the accumulator pressure signal is substantially constant for a short time period, it may indicate that the accumulator 270 is no longer charging and the pressures $P_R$, $P_A$ on both sides of the restrictive orifice 290 are substantially equal. When discharge control valve 276 is in the second position, $P_R$ may be substantially equal to the motor 218 inlet pressure P. The controller 262 may control the hydraulic fan circuit 210 in such a way that the motor 218 outlet pressure $P_O$ is substantially zero, or another known constant value at all times. Since during the time period when $P_A$ remains constant, $P_I$ equals $P_A$, and $P_O$ is a known constant, the pressure differential across the motor 218, $\Delta P_{MK}$, may be estimated. A corresponding fan 220 speed, $N_{FK}$, may be determined through the fan speed signal. $\Delta P_{MK}$ and $N_{FK}$ at this operating point may be stored by the controller 262 in the memory component.

Method 400 proceeds from step 404 to step 406. Step 406 includes determining a periodic motor 218 input pressure, $P_{In}$, n=1, 2, 3, . . . , as a function of the known pressure differential, $\Delta P_{MK}$, the known fan 220 speed, $N_{FK}$, the known motor 218 outlet pressure, $P_O$, and a periodic fan 220 speed, $N_{Fn}$, n=1, 2, 3 . . . , as shown in equation 5:

$$P_{In} = f(\Delta P_{MK}, N_{FK}, P_O, N_{Fn}) \qquad \text{equation 5}$$

where $P_{In}$ is the periodic motor 218 input pressure, $\Delta P_{MK}$ is the known pressure differential, $N_{FK}$ is the known fan speed, $P_O$ is the known outlet pressure, and $N_{Fn}$ is the periodic fan speed.

The fan speed sensor 202 may be configured to produce a periodic fan speed signal indicative of the fan 220 speed. Controller 262 may be configured to receive the periodic fan speed signal and infer the periodic fan 220 speed.

It is known in the art: that the power to drive a fan changes by the ratio of fan speeds to the third power as shown in equation 6:

$$hp_{F2} = hp_{F1}^*(N_{F2}/N_{F1})^3 \qquad \text{equation 6}$$

where $N_{F1}$ is a first fan 220 speed, $N_{F2}$ is a second fan 220 speed, $hp_{F1}$ is the power needed to drive the fan 220 at a first speed, and $hp_{F2}$ is the power needed to drive the fan 220 at a second speed.

It is also known in the art: that power is equal to torque multiplied by speed as shown in equation 7:

$$hp = T^*N \qquad \text{equation 7}$$

where hp is power, T is torque, and N is speed. In the context of hydraulic fan circuit 210, equation 7 may be interpreted as the power needed to drive fan 220 at a particular speed is equal to the motor 218 torque multiplied by the fan 220 speed.

Substituting equation 7 into equation 6 yields equation 8:

$$T_{F2}^*N_{F2} = T_{F1}^*N_{F1}^*(N_{F2}/N_{F1})^3 \qquad \text{equation 8}$$

where $N_{F1}$ is a first fan 220 speed, $N_{F2}$ is a second fan 220 speed, $T_{F1}$ is the motor 218 torque at the first speed, and $T_{F2}$ is the motor 218 torque at the second speed. Simplifying equation 8 yields equation 9:

$$T_{F2} = T_{F1}^*(N_{F2}/N_{F1})^2 \qquad \text{equation 9}$$

where $N_{F1}$ is a first fan 220 speed, $N_{F2}$ is a second fan 220 speed, $T_{F1}$ is the motor 218 torque at the first speed, and $T_{F2}$ is the motor 218 torque at the second speed.

It is well known to ordinary persons skilled in the art that motor torque is equal to pressure times displacement as expressed in equation 10:

$$T_M = \Delta P_M^*V_{MD} \qquad \text{equation 10}$$

where $T_M$ is motor torque, $\Delta P_M$ is the pressure differential across the motor, and $V_{MD}$ is the displacement of the motor.

Equation 10 may be substituted into equation 9 to yield equation 11:

$$\Delta P_{M2}^*V_{MD2} = \Delta P_{M1}^*V_{MD1}^*(N_{F2}/N_{F1})^2 \qquad \text{equation 11}$$

where $N_{F1}$ is a first fan 220 speed, $N_{F2}$ is a second fan 220 speed, $\Delta P_{M1}$ is the pressure differential across the motor 218 at the first speed, $\Delta P_{M2}$ is the pressure differential across the motor 218 at the second speed, $V_{MD1}$ is the displacement of the motor 218 at the first speed, and $V_{MD2}$ is the displacement of the motor 218 at the second speed.

In an embodiment where the motor 218 is a fixed displacement motor, or is operated at a substantially fixed displacement, the displacement terms are constants and cancel each other to yield equation 12:

$$\Delta P_{M2} = \Delta P_{M1}^*(N_{F2}/N_{F1})^2 \qquad \text{equation 12}$$

where $N_{F1}$ is a first fan 220 speed, $N_{F2}$ is a second fan 220 speed, $\Delta P_{M1}$ is the pressure differential across the motor 218 at the first speed, and $\Delta P_{M2}$ is the pressure differential across the motor 218 at the second speed.

The motor 218 pressure differential and the fan 220 speed for one hydraulic fan circuit 210 operating point are known from step 404 and may be substituted into equation 12 to yield equation 13:

$$\Delta P_{M2} = \Delta P_{MK} * (N_{F2}/N_{FK})^2 \quad \text{equation 13}$$

where $N_{FK}$ is a known fan 220 speed, $N_{F2}$ is a second fan 220 speed, $\Delta P_{MK}$ is a known pressure differential across the motor 218 at the known speed, and $\Delta P_{M2}$ is the pressure differential across the motor 218 at the second speed.

In an embodiment where the hydraulic fan circuit 210 is operated such that the motor 218 output $P_O$ is close to, if not equal to, zero, the inlet motor 218 pressure $P_I$ is equal to the pressure differential $\Delta P_M$ across the motor.

$$P_{In} = \Delta P_{MK} * (N_{Fn}/N_{FK})^2 \quad \text{equation 14}$$

where $P_{In}$ is the periodic motor 218 input pressure, $\Delta P_{MK}$ is the known pressure differential, $N_{FK}$ is the known fan speed, and $N_{Fn}$ is the periodic fan speed.

In other embodiments where the hydraulic fan circuit 210 is operated such that the motor 218 output $P_O$ is close to a known non-zero value, the inlet motor 218 pressure $P_I$ is equal to the pressure differential $\Delta P_M$ across the motor minus the known non-zero value. Assuming that $P_O$ is equal to a known outlet pressure yields equation 15:

$$P_{In} = [\Delta P_{MK} * (N_{Fn}/N_{FK})^2] + P_O \quad \text{equation 15}$$

where $P_{In}$ is the periodic motor 218 input pressure, $\Delta P_{MK}$ is the known pressure differential, $N_{FK}$ is the known fan speed, $P_O$ is the known outlet pressure, and $N_n$ is the periodic fan speed.

The controller 262 may calculate and/or estimate the periodic fan 220 speed as a function of the fan speed signal received from the fan speed sensor 202. Since all other terms are known, the periodic motor 218 inlet pressure may be calculated and/or estimated by controller 262. The method 400 proceeds from step 406 to step 408.

In step 408 the controller 262 may determine a periodic fluid flow to the accumulator 270 during charging as a function of the cross sectional area of restrictive orifice 290, the fluid density, a periodic accumulator 270 pressure, and the periodic motor 218 inlet pressure, as expressed in equation 16:

$$Q_n = f(A, \rho, P_{An}, P_{In}) \quad \text{equation 16}$$

where $Q_n$ (n=1, 2, 3 . . . ) is a periodic flow rate during charging, A is the known cross sectional area of the restrictive orifice 290, $\rho$ is the density of the fluid, $P_{An}$ (n=1, 2, 3 . . . ) is the periodic accumulator 270 pressure as indicated by the accumulator pressure signal from sensor 296, and $P_{In}$ is the periodic motor 218 input pressure.

It is well known by ordinary persons skilled in the art that flow rate is equal to a constant times the area of a restriction times the square root of the quotient of the differential pressure times two and the density of the fluid. The flow rate to the accumulator 270 from the hydraulic fan circuit 210 may be substantially equal to the flow rate through the restrictive orifice 290. The restrictive orifice 290 has a substantially constant cross sectional area which will be known by system designers. The pressure on the accumulator 270 side of the restrictive orifice 290, $P_A$, may be determined by the accumulator pressure signal generated by the pressure sensor 296. While the discharge control valve 76 is in the second position, and the accumulator 270 is charging, the pressure on the input of the restrictive orifice 290, $P_R$, is substantially equal to the motor 218 inlet pressure $P_I$. The periodic flow rate may then be calculated and/or estimated by equation 17:

$$Q_n = C*A(\sqrt{[2(P_{In} - P_{An})/\rho]}) \quad \text{equation 17}$$

where $Q_n$ is a periodic flow rate during charging, C is a known constant determined through calculations from system geometry or experimentally, A is the known cross sectional area of the restrictive orifice 290, $\rho$ is the density of the fluid, $P_{An}$ is the periodic accumulator 270 pressure, and $P_{In}$ is the periodic motor 218 input pressure.

In embodiments including the additional hydraulic circuit 228, the flow rate to the accumulator 270 during charging from hydraulic circuit 228 may be calculated and/or estimated using similar methods or any other method which would be known to an ordinary person skilled in the art now or in the future. The method 400 proceeds from step 408 to step 410.

Step 410 includes calculating and/or estimating the charging volume, $V_C$ as a function of the integration of the periodic flow rate of fluid to the accumulator 270, $Q_n$, during accumulator 270 charging. This yields equation 18:

$$V_C = \int_{t1}^{t2} Q_n \, dt \quad \text{equation 18}$$

where $V_C$ is the charging volume, $Q_n$ is the periodic flow rate through restrictive orifice 290 during accumulator 270 charging, t1 is the beginning of an accumulator 270 charging period, and t2 is the end of an accumulator 270 charging period.

The accumulator 270 charging volume may be calculated for each period that the hydraulic fan circuit 210 is operating in a mode where the accumulator 270 is being charged. Methods for integrating a periodic value, such as a flow rate, over a time period are well known by ordinary persons skilled in the art. These charging volumes may be added together along with any charging volumes from the other hydraulic circuit 228 to determine a total charging volume for a time period.

It is well known by ordinary persons skilled, in the art for a controller 262 to save periodic values in the memory component(s). When calculating a periodic value using other stored periodic values, the controller 262 may use the most recent periodic value in the calculation and/or estimation method.

Although the exemplary embodiment of the method to determine a charging volume of an accumulator 270 assumes periodic signals from the fan speed sensor 202 and the pressure sensor 296, an ordinary person skilled in the art will recognize that the steps and equations in the method 400 may be easily adapted to use a constant or occasionally sporadic signal. A non-limiting example of a constant signal includes an analogue signal. Electronic devices to perform mathematical operations such as addition, multiplication, and integration of analogue signals are well known by ordinary persons skilled in the art.

The method 400 proceeds from step 410 to step 412. The method ends at step 412.

Referring back to FIG. 3, the method to determine an accumulator 270 fluid charge proceeds from step 306 to step 308. Step 308 includes determining the discharging fluid volume of accumulator 270. The discharging fluid volume of accumulator 270 may be the volume of fluid in the accumulator 270 at the end of a discharge period. An ordinary person skilled in the art will recognize that the end of a discharge period may be at any time during a discharge period that it is desired to calculate the volume of fluid in accumulator 270.

Figure 5:
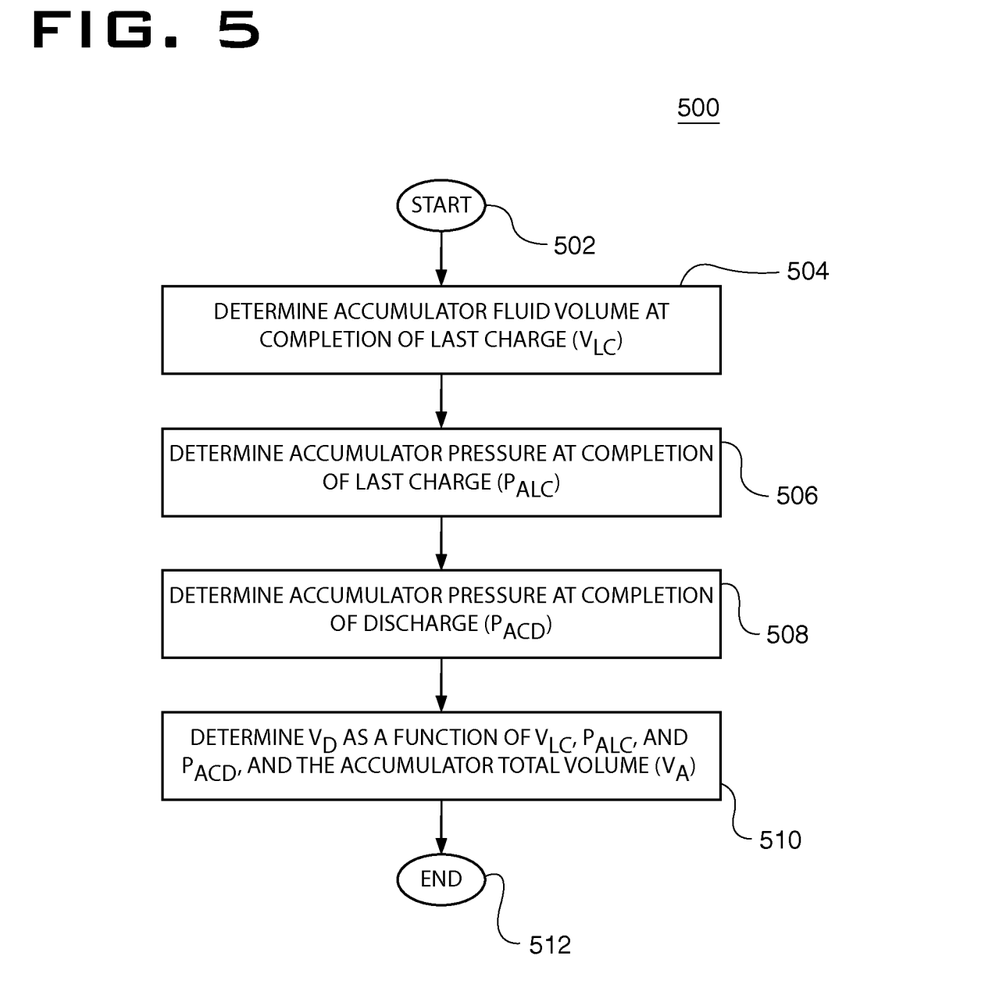
FIG. 5 is a flow chart of an exemplary method to estimate an accumulator discharging fluid volume.

Referring to FIG. 5, a flow chart of an exemplary embodiment of a method 500 to determine the discharging fluid volume of an accumulator 270 is depicted. The method 500 starts at step 502. The method 500 proceeds from step 502 to step 504. Step 504 includes determining the accumulator 270 fluid volume at the completion of the last charging period.

The controller 262 may store the accumulator 270 fluid volume at the completion of a charging period. In one embodiment the controller 262 may determine the accumulator 270 fluid volume at the completion of the last charging period by adding the accumulator 270 beginning fluid volume and any accumulator 270 charging fluid volumes. The method 500 proceeds from step 504 to step 506.

Step 506 includes determining the accumulator 270 pressure at the completion of the last charging period. The controller 262 may determine the accumulator 270 pressure at the completion of the last charging period as a function of the accumulator pressure signal from the pressure sensor 296, and store the value in the memory. The method 500 proceeds from step 506 to step 508.

Step 508 includes determining the accumulator pressure at the completion of a discharge period. When the discharge control valve 276 is in the third position, the accumulator 270 may discharge. The controller 262 may determine the accumulator 270 pressure at the completion of the discharge period as a function of the accumulator pressure signal from the pressure sensor 296, and store the value in the memory. The method 500 proceeds from step 508 to step 510.

Step 510 includes determining the accumulator 270 fluid volume at the completion of a discharge period, $V_D$, as a function of the accumulator 270 fluid volume at the completion of the last charging period, $V_{LC}$, the accumulator 270 pressure at the completion of the last charging period, $P_{ALC}$, the accumulator 270 pressure at the completion of the discharge period, $P_{ACD}$, and the total accumulator 270 volume, $V_{TA}$. This yields the function expressed in equation 19:

$$V_D = f(V_{LC}, P_{ALC}, P_{ACD}, V_{TA}) \quad \text{equation 19}$$

where $V_D$ is the discharging fluid volume of accumulator 270, $V_{LC}$ is the fluid volume of accumulator 270 at the completion of the last charging period, $P_{ALC}$ is the accumulator 270 pressure at the completion of the last charging period, $P_{ACD}$ is the accumulator 270 pressure at the completion of the discharge period, and $V_{TA}$ is the total volume of the accumulator 270. In the depicted embodiment, the discharge period may include any period when the discharge control valve 276 is in the third position and the accumulator 270 is discharging fluid.

From knowledge of the design of the accumulator 270, an ordinary person skilled in the art will know the total accumulator 270 volume, $V_{TA}$. It is well known to ordinary persons skilled in the art that the accumulator 270 total volume, $V_{TA}$, is equal to the sum of the volume of fluid in the accumulator 270, $V_F$, and the volume of gas in the accumulator 270, $V_G$, as represented in equation 20:

$$V_{TA} = V_F + V_G \quad \text{equation 20}$$

where $V_{TA}$ is the total accumulator 270 volume, $V_F$ is the volume of fluid in the accumulator 270, and $V_G$ is the volume of gas in the accumulator 270.

At the completion of a charging period, the volume of gas in the accumulator 270, $V_{GLC}$, will then equal the total volume of the accumulator 270, $V_{TA}$, less the volume of fluid in the accumulator 270, $V_{LC}$, at the completion of the last charging period, as represented by equation 21:

$$V_{GLC} = V_{TA} - V_{LC} \quad \text{equation 21}$$

where $V_{GLC}$ is the volume of gas in the accumulator 270 at the completion of the last charging period, $V_{TA}$ is the total accumulator 270 volume, and $V_{LC}$ is the volume of fluid in the accumulator 270, at the completion of the last charging period.

Similarly, at the completion of a discharge period, the volume of gas in the accumulator 270, $V_{GD}$, will then equal the total volume of the accumulator 270, $V_{TA}$, less the volume of fluid in the accumulator 270, $V_D$, at the completion of the discharge period, as represented by equation 22:

$$V_{GD} = V_{TA} - V_D \quad \text{equation 22}$$

where $V_{GD}$ is the volume of gas in the accumulator 270 at the completion of the discharge period, $V_{TA}$ is the total accumulator 270 volume, and $V_D$ is the volume of fluid in the accumulator 270, at the completion of the discharge period.

From gas laws, ordinary persons skilled in the art will know that the product of the pressure of a gas, $P_{G1}$, and volume of the gas to a power, $(V_{G1})^n$, at a first pressure equals the product of the pressure of the gas, $P_{G2}$, and volume of the gas to a power, $(V_{G2})^n$, of the gas at a second pressure, and that both equal a constant, as expressed in equation 23:

$$P_{G1}*(V_{G1})^n = P_{G2}*(V_{G2})^n = K \quad \text{equation 23}$$

where $P_{G1}$ is the pressure of a gas at a first pressure, $P_{G2}$ is the pressure of the gas at a second pressure, $V_{G1}$ is the volume of the gas at the first pressure, $V_{G2}$ is the volume of the gas at the second pressure, K is a constant, and n is a variable based upon the gas and other factors.

It is well known by ordinary persons skilled in the art that as long as the accumulator 270 is charged with fluid, the fluid pressure, $P_F$, in the accumulator 270 will be equal to the gas pressure, $P_G$, in the accumulator 270. Applying this knowledge to equation 23 yields equation 24:

$$P_{F1}*(V_{G1})^n = P_{F2}*(V_{G2})^n = K \quad \text{equation 24}$$

where $P_{F1}$ is the pressure of a fluid in the accumulator 270 at a first gas pressure, $P_{F2}$ is the pressure of a fluid in the accumulator 270 at a second gas pressure, $V_{G1}$ is the volume of the gas at the first gas pressure, $V_{G2}$ is the volume of the gas at the second gas pressure, K is a constant, and n is a variable based upon the gas and other factors.

Equation 24 may be rearranged to yield equation 25:

$$(P_{F1}/P_{F2})^{1/n} * V_{G1} = V_{G2} \quad \text{equation 25}$$

where $P_{F1}$ is the pressure of a fluid in the accumulator 270 at a first gas pressure, $P_{F2}$ is the pressure of a fluid in the accumulator 270 at a second gas pressure, $V_{G1}$ is the volume of the gas at the first gas pressure, $V_{G2}$ is the volume of the gas at the second gas pressure, and n is a variable based upon the gas and other factors.

From equation 21, the volume of gas in the accumulator 270, $V_{GLC}$, at the completion of the last charging period may be expressed as a function of the total volume of the accumulator 270, $V_{TA}$, and the volume of fluid in the accumulator 270, $V_{LC}$, at the completion of the last charging period. The pressure of the fluid at the completion of the last charging period, $P_{ALC}$, may have been stored by the controller 262 as explained above in relation to step 506. Substituting the pressure of the fluid at the completion of the last charging period, $P_{ALC}$, for the pressure of a fluid in the accumulator 270 at a first gas pressure; and the volume of gas in the accumulator 270, $V_{GLC}$, at the completion of the last charging period for the volume of a gas in the accumulator 270 at a first gas pressure; into equation 25, yields equation 26:

$$(P_{ALC}/P_{F2})^{1/n} * (V_{TA} - V_{LC}) = V_{G2} \quad \text{equation 26}$$

where $P_{ALC}$ is the pressure of the fluid in accumulator 270 at the completion of the last charging period, $P_{F2}$ is the pressure of a fluid in the accumulator 270 at a second gas pressure, $V_{TA}$ the total volume of the accumulator 270, $V_{LC}$ is the volume of fluid in the accumulator 270 at the completion of the last charging period, $V_{G2}$ is the volume of the gas at the second gas pressure, and n is a variable based upon the gas and other factors.

From equation 22, the volume of gas in the accumulator 270, $V_{GD}$, at the completion of the discharge period may be expressed as a function of the total volume of the accumulator 270, $V_{TA}$, and the volume of fluid in the accumulator 270, $V_D$, at the completion of the discharge period. The pressure of the fluid at the completion of the discharge period, $P_{ACD}$, may be calculated and/or estimated by the controller 262 from the accumulator pressure signal generated by the pressure sensor 296 as explained above in relation to step 508. Substituting the pressure of the fluid at the completion of the discharge period, $P_{ACD}$, for the pressure of a fluid in the accumulator 270 at a second gas pressure; and the volume of gas in the accumulator 270, $V_{GD}$, at the completion of the discharge period for the volume of a gas in the accumulator 270 at a second gas pressure; into equation 26, yields equation 27:

$$(P_{ALC}/P_{ACD})^{1/n} * (V_{TA} - V_{LC}) = (V_{TA} - V_D) \quad \text{equation 27}$$

where $P_{ALC}$ is the pressure of the fluid in accumulator 270 at the completion of the last charging period, $P_{F2}$ is the pressure of a fluid in the accumulator 270 at a second gas pressure, $V_{TA}$ the total volume of the accumulator 270, $V_{LC}$ is the volume of fluid in the accumulator 270 at the completion of the last charging period, $V_D$ is the volume of fluid in the accumulator 270 at the completion of a discharge period, and n is a variable based upon the gas and other factors.

Rearranging equation 27 to solve for the volume of fluid in the accumulator 270, $V_D$, at the completion of a discharge period yields equation 28:

$$V_D = V_{TA} - [(P_{ALC}/P_{ACD})^{1/n} * (V_{TA} - V_{LC})] \quad \text{equation 28}$$

where $P_{ALC}$ is the pressure of the fluid in accumulator 270 at the completion of the last charging period, $P_{F2}$ is the pressure of a fluid in the accumulator 270 at a second gas pressure, $V_{TA}$ the total volume of the accumulator 270, $V_{LC}$ is the volume of fluid in the accumulator 270 at the completion of the last charging period, $V_D$ is the volume of fluid in the accumulator 270 at the completion of a discharge period, and n is a variable based upon the gas and other factors.

The method 500 proceeds from step 510 to step 512. The method 500 ends at step 512.

Referring back to FIG. 3, the method 300 proceeds from step 308 to step 310. At step 310, the controller 262 may determine the current volume of fluid in accumulator 270, $V_A$, as a function of the beginning volume of fluid in accumulator 270, $V_B$, the charging volume of fluid in accumulator 270, $V_C$, and the discharging volume of fluid in accumulator 270, $V_D$. The current volume of fluid in accumulator 270 may be expressed by equation 29:

$$V_A = f(V_B, V_C, V_D) \quad \text{equation 29}$$

Where $V_A$ is the current volume of fluid in accumulator 270, $V_B$ is the beginning volume of fluid in accumulator 270, $V_C$ is the charging volume of fluid in accumulator 270, and $V_D$ is the discharging volume of fluid in accumulator 270.

If the accumulator 270 is charging, the current fluid volume in accumulator 270, $V_A$, may be calculated and/or estimated by the controller 262 through adding the charging volume, $V_C$, to the beginning volume, $V_B$. The beginning volume, $V_B$, may be calculated and/or estimated through the method described in relation to the start-up of system 200, or if the accumulator 270 has discharged prior to the current charging period, through the calculation of the volume of fluid in accumulator 270 at the end of the last discharge period, $V_D$, as would be known by an ordinary person skilled in the art now or in the future.

If the accumulator 270 is discharging, the current fluid volume in accumulator 270, $V_A$, may be calculated and/or estimated by the controller 262 through calculating the discharge volume, $V_D$. The method 300 proceeds from step 310 to step 312.

Step 312 includes determining the accumulator 270 pressure, $P_A$. The accumulator pressure, $P_A$, may be determined by controller 262 through the accumulator pressure signal generated by the pressure sensor 296. The method 300 proceeds from step 312 to step 314.

Step 314 includes determining the fluid charge of the accumulator 270 as a function of the current fluid volume of accumulator 270, $V_A$, and the accumulator pressure, $P_A$.

It is well known by ordinary persons skilled in the art that hydraulic energy, F, is equal to fluid volume, $V_F$, multiplied by fluid pressure, $P_F$, as expressed by equation 30:

$$E = P_F * V_F \quad \text{equation 30}$$

where E is hydraulic energy, $P_F$ is fluid pressure, and $V_F$ is fluid volume.

Applying equation 30, the controller 262 may calculate and/or estimate the fluid energy in the accumulator 270, $A_{FE}$, by multiplying the accumulator 270 pressure, $P_A$, by the current fluid volume in accumulator 270, $V_A$, as expressed in equation 31:

$$A_{FE} = P_A * V_A \quad \text{equation 30}$$

where $A_{FE}$ is the fluid energy in accumulator 270, $P_A$ is the accumulator 270 pressure, and $V_A$ is the current fluid volume in accumulator 270. The method 300 proceeds from step 314 to step 316. The method 300 ends at step 316.

Ordinary persons skilled in the art now or in the future will recognize that the calculations, estimations, and equations in the above described methods may be modified to take into account system losses and system geometry and design as would be known by ordinary persons skilled the art now or in the future.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A method for estimating a fluid charge of a hydraulic accumulator in a hydraulic fan circuit including a primary pump, a motor selectively fluidly connected to the pump, and drivingly connected to a fan, comprising:
   determining, at a microprocessor, a first accumulator pressure at a first time with a pressure sensor, the first time being during accumulator charging,
   determining, at the microprocessor, a second accumulator pressure at a second time with the pressure sensor, the second time being during accumulator charging,
   determining, at the microprocessor, a first fan speed at the first time,
   determining, at the microprocessor, a second fan speed at the second time,
   estimating, at the microprocessor, the fluid charge of the hydraulic accumulator as a function of the first accumulator pressure, the second accumulator pressure, the first fan speed, and the second fan speed, and
   controlling, using the microprocessor, the hydraulic fan circuit based upon said estimating.

2. The method of claim 1, further comprising:
determining, at the microprocessor, a third fan speed,
determining, at the microprocessor, a motor pressure differential for the third fan speed,
determining, at the microprocessor, a motor output pressure,
determining, at the microprocessor, a first motor inlet pressure at the first time as a function of the first fan speed, the motor pressure differential, the third fan speed, and the motor output pressure,
determining, at the microprocessor, a second motor inlet pressure at the second time as a function of the second fan speed, the motor pressure differential, the third fan speed, and the motor output pressure, and
further estimating, at the microprocessor, the fluid charge of the hydraulic accumulator as a function of the first accumulator pressure, the second accumulator pressure, the first fan speed, the second fan speed, the first motor inlet pressure, and the second motor inlet pressure.

3. The method of claim 2, further comprising:
determining, at the microprocessor, a first flow at the first time as a function of the first accumulator pressure, the first motor inlet pressure, and a cross section area of a fixed orifice,
determining, at the microprocessor, a second flow at the second time as a function of the second accumulator pressure, the second motor inlet pressure, and the cross section area, and
further estimating, at the microprocessor, the fluid charge of the hydraulic accumulator as a function of the first accumulator pressure, the second accumulator pressure, the first fan speed, the second fan speed, the first motor inlet pressure, the second motor inlet pressure, the first flow, and the second flow.

4. The method of claim 3, further comprising:
determining, at the microprocessor, a charging fluid volume as a function of the first flow and the second flow, and
further estimating, at the microprocessor, the fluid charge of the hydraulic accumulator as a function of the first accumulator pressure, the second accumulator pressure, the first fan speed, the second fan speed, the first motor inlet pressure, the second motor inlet pressure, the first flow, the second flow, and the charging fluid volume.

5. The method of claim 1, further comprising:
determining, at the microprocessor, a charging fluid volume as a function of the first accumulator pressure, the second accumulator pressure, the first fan speed, and the second fan speed,
determining, at the microprocessor, a discharging fluid volume, and
further estimating, at the microprocessor, the fluid charge of the hydraulic accumulator as a function of the first accumulator pressure, the second accumulator pressure, the first fan speed, the second fan speed, the charging fluid volume, and the discharging fluid volume.

6. The method of claim 5 wherein the discharging fluid volume is determined as a function of an accumulator fluid volume at the completion of a last charge, an accumulator pressure at the completion of the last charge, an accumulator pressure during or at the completion of an accumulator discharge, and an accumulator total volume.

7. The method of claim 5, further comprising:
determining, at the microprocessor, a beginning fluid volume, and
further estimating, at the microprocessor, the fluid charge of the hydraulic accumulator as a function of the first accumulator pressure, the second accumulator pressure, the first fan speed, the second fan speed, the beginning fluid volume, the charging fluid volume, and the discharging fluid volume.

8. A method for estimating a fluid charge of a hydraulic accumulator in a hydraulic fan circuit including a primary pump, a motor selectively fluidly connected to the primary pump, and drivingly connected to a fan, comprising:
determining, at a microprocessor, periodic accumulator pressures with a pressure sensor during an accumulator charging time period,
determining, at the microprocessor, periodic fan speeds during the accumulator charging time period,
estimating, at the microprocessor, the fluid charge of the hydraulic accumulator as a function of the periodic accumulator pressures and the periodic fan speeds, and
controlling, using the microprocessor, the hydraulic fan circuit based upon said estimating.

9. The method of claim 8, further comprising:
determining, at the microprocessor, a motor pressure differential for a third fan speed,
determining, at the microprocessor, a motor output pressure,
determining, at the microprocessor, periodic motor inlet pressures during the accumulator charging period as a function of the periodic fan speeds, the motor pressure differential, the third fan speed, and the motor output pressure, and
further estimating, at the microprocessor, the fluid charge of the hydraulic accumulator as a function of the periodic accumulator pressures, the periodic fan speeds and the periodic motor inlet pressures.

10. The method of claim 9, further comprising:
determining, at the microprocessor, periodic flows during the accumulator charging period as a function of the periodic accumulator pressures, the periodic motor inlet pressures, and a cross section area of a fixed orifice, and
further estimating, at the microprocessor, the fluid charge of the hydraulic accumulator as a function of the periodic accumulator pressures, periodic motor inlet pressures, the periodic fan speeds, and the periodic flows.

11. The method of claim 10, further comprising:
determining, at the microprocessor, a charging fluid volume for the accumulator charging period as a function of integrating the periodic flows during the accumulator charging period, and
further estimating, at the microprocessor, the fluid charge of the hydraulic accumulator as a function of the periodic accumulator pressures, periodic motor inlet pressures, the periodic fan speeds, the periodic flows, and the charging fluid volume.

12. The method of claim 8, further comprising:
determining, at the microprocessor, a charging fluid volume for the accumulator charging period as a function of the periodic accumulator pressures, and the periodic fan speeds,
determining, at the microprocessor, a discharging fluid volume for an accumulator discharging period, and
further estimating, at the microprocessor, the fluid charge of the hydraulic accumulator as a function of the periodic accumulator pressures, the periodic fan speeds, the charging fluid volume, and the discharging fluid volume.

13. The method of claim 12, wherein the discharging fluid volume is determined as a function of an accumulator fluid volume at the completion of a last charge, an accumulator pressure at the completion of the last charge, an accumulator pressure at the completion of the accumulator discharge period, and an accumulator total volume.

14. The method of claim 12, further comprising:
determining, at the microprocessor, a beginning fluid volume, and
estimating, at the microprocessor, the fluid charge of the hydraulic accumulator as a function of the periodic accumulator pressures, the periodic fan speeds, the beginning fluid volume, the charging fluid volume, and the discharging fluid volume.

15. An accumulator fluid charge estimation system, comprising:
a hydraulic fan circuit including:
a primary pump,
a primary accumulator selectively fluidly connected to the primary pump,
a fan,
a motor selectively fluidly connected to the primary pump, and drivingly connected to the fan, a fan speed sensor configured to generate periodic fan speed signals indicative of periodic speeds of the fan, and
a pressure sensor configured to produce periodic accumulator pressure signals indicative of periodic accumulator pressures at the primary accumulator; and
a microprocessor configured to:
determine, at the microprocessor, the periodic accumulator pressures with the pressure sensor during an accumulator charging time period,
determine, at the microprocessor, the periodic fan speeds during the accumulator charging time period,
estimate, at the microprocessor, a fluid charge of the primary accumulator as a function of the periodic accumulator pressures and the periodic fan speeds during the accumulator charging time period, and
control, using the microprocessor, the hydraulic fan circuit based upon the estimated fluid charge.

16. The system of claim 15, further including a fixed orifice configured to restrict a quantity of fluid flowing in or out of the primary accumulator.

17. The system of claim 15, further including an accumulator charge control valve configured to selectively fluidly connect the primary pump to the primary accumulator, and selectively fluidly connect the primary accumulator to the motor.

18. The system of claim 17, wherein;
the accumulator charge control valve includes a three position valve configured to move to a first position, a second position, or a third position as a function of a valve control signal, and the microprocessor is communicatively connected to the accumulator charge control valve and configured to generate the valve control signal.

19. An accumulator fluid charge estimation system, comprising:
a hydraulic fan circuit including:
a primary pump,
a primary accumulator selectively fluidly connected to the primary pump,
a fan, a motor selectively fluidly connected to the primary pump, and drivingly connected to the fan,
a fan speed sensor configured to generate a first fan speed signal indicative of a first fan speed at a first time during an accumulator charging period, and a second fan speed signal indicative of a second fan speed at a second time during the accumulator charging period, and a pressure sensor configured to produce a first accumulator pressure signal indicative of a first accumulator pressure at the primary accumulator at the first time, and a second accumulator pressure signal indicative of a second accumulator pressure at the primary accumulator at the second time; and
a microprocessor configured to:
determine, at the microprocessor, the first accumulator pressure at the first time with the pressure sensor, the first time being during the accumulator charging period,
determine, at the microprocessor, the second accumulator pressure at the second time with the pressure sensor, the second time being during the accumulator charging period,
determine, at the microprocessor, the first fan speed at the first time,
determine, at the microprocessor, the second fan speed at the second time,
estimate, at the microprocessor, a fluid charge of the primary accumulator as a function of the first accumulator pressure, the second accumulator pressure, the first fan speed, and the second fan speed, and
control, using the microprocessor, the hydraulic fan circuit based upon the estimated fluid charge.

20. A machine, comprising:
an engine,
a hydraulic fan circuit including:
a primary pump drivingly connected to the engine a primary accumulator selectively fluidly connected to the primary pump,
a fan positioned to cool the engine,
a motor selectively fluidly connected to the primary pump, and drivingly connected to the fan, a fan speed sensor configured to generate periodic fan speed signals indicative of periodic speeds of the fan, and
a pressure sensor configured to produce periodic accumulator pressure signals indicative of periodic accumulator pressures at the primary accumulator;
a directional control valve configured to control a flow direction of a fluid associated with a supply passage from the primary pump to the motor and with a return passage from the motor to the primary pump, the directional control valve configured to direct the fluid to flow either from the primary pump through the supply passage in a forward direction, or from the primary pump through the return passage in a reverse direction, wherein the directional control valve is moveable between a first position to direct the fluid flowing in the forward direction from the primary accumulator to the return passage, and a second position to direct the fluid flowing in the forward direction from the supply passage to the primary accumulator; and
a microprocessor configured to:
determine, at the microprocessor, the periodic accumulator pressures with the pressure sensor during an accumulator charging time period,
determine, at the microprocessor, the periodic fan speeds during the accumulator charging time period,
estimate, at the microprocessor, a fluid charge of the primary accumulator as a function of the periodic accumulator pressures and the periodic fan speeds during the accumulator charging time period, and
control, using the microprocessor, the hydraulic fan circuit based upon the estimated fluid charge.

* * * * *